United States Patent [19]

Novich

[11] Patent Number: 5,088,974
[45] Date of Patent: Feb. 18, 1992

[54] PROCESS FOR FACILITATING REMOVAL OF CLASSIFIED POWDERS

[75] Inventor: Bruce E. Novich, Lexington, Mass.

[73] Assignee: Ceramics Process Systems Corporation, Milford, Mass.

[21] Appl. No.: 439,793

[22] Filed: Nov. 21, 1989

Related U.S. Application Data

[60] Division of Ser. No. 36,325, Apr. 9, 1987, Pat. No. 4,882,088, which is a continuation-in-part of Ser. No. 28,891, Mar. 23, 1987, Pat. No. 4,781,671.

[51] Int. Cl.$^5$ .............................................. B01D 21/26
[52] U.S. Cl. ..................................................... 494/37
[58] Field of Search ...................... 494/37, 27, 85, 68, 494/36; 209/5; 252/313.1, 313.2

[56] References Cited

U.S. PATENT DOCUMENTS

| | | | |
|---|---|---|---|
| 2,905,643 | 9/1959 | Billue | 494/27 |
| 4,018,673 | 4/1977 | Hughes | 209/5 |
| 4,650,521 | 3/1987 | Koppelman | 106/309 |

Primary Examiner—Robert W. Jenkins

[57] ABSTRACT

Removal of classified particles from the classifier apparatus is simplified by the addition of a polymeric dispersant in the slurry, added in an amount substantially in excess of that needed to disperse the particles.

6 Claims, 1 Drawing Sheet

PROCESS FOR FACILITATING REMOVAL OF CLASSIFIED POWDERS

This application is a division of Ser. No. 07/036,325 filed Apr. 9, 1987 and issued Nov. 21, 1989 as U.S. Pat. No. 4,882,088; which in turn is a continuation-in-part of Ser. No. 07/028,891 filed Mar. 23, 1987 and issued Nov. 1, 1988 as U.S. Pat. No. 4,781,671.

FIELD OF THE INVENTION

This invention relates to a process for centrifugal classification of powders and in particular, to removal of those powders from the centrifuge bowl.

BACKGROUND OF THE INVENTION

There are numerous advantages in using narrow size range ceramic powders as starting materials, including uniform microstructures leading to optimal performance properties. One method of producing narrow size materials is by a centrifugal classification system, described in the above application. One of the problems encountered in making narrow size range powders in this fashion, is that the resulting powder is dilatent and quite difficult to remove from the centrifuge bowl, often requiring the powder to be chiseled out in a batch mode. The dilatent aspect of the powder prevents continuous classification to be carried out using conventional equipment, such as an auger-type implement which empties the bowls.

DISCLOSURE OF THE INVENTION

I have found that by providing a substantial excess in the amount of dispersant necessary for dispersion of particles in the feed slurry, the colloidal dispersion of the feed material remains stable and the classified narrow size range particles form a plastic rather than dilatent cake in the centrifuge bowl. Unlike a dilatent cake, this can be handled easily and can be scooped out of the centrifuge bowl rather than forced out. The plastic character of the cake formed in accordance with this invention allows a centrifugation classification system to operate continuously and efficiently.

DETAILED DESCRIPTION OF THE INVENTION

Figure 1:
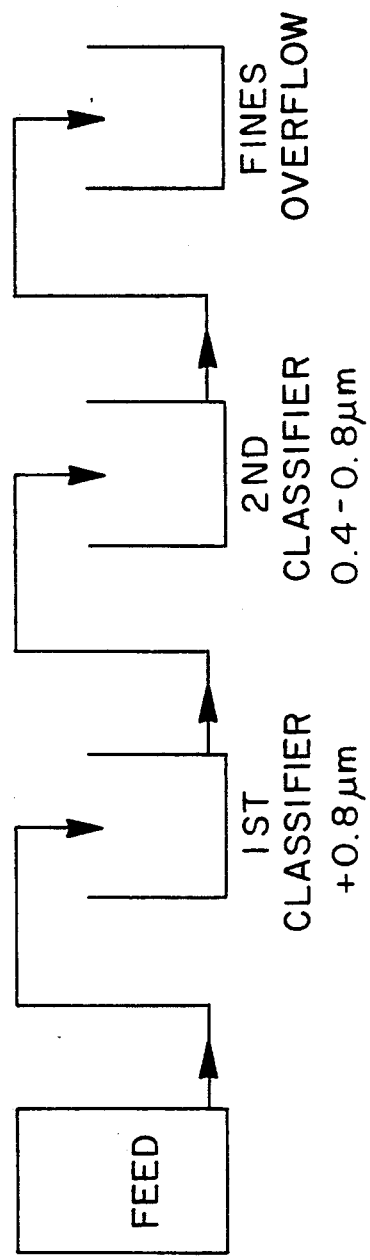
FIG. 1 is a flow diagram of the centrifugal classification process according to the present invention.

The present invention may be applied to any type of colloidal particle which one wishes to classify by centrifugation techniques. Preferred embodiments use metallic particles and ceramic particles, particularly, but not limited to, alumina, yttria, silicon nitride, alloys of silicon nitride, forsterite, mullite, cordierite, partially stabilized zirconia, and silicon carbide.

In the past, powder would be mixed with liquid to produce a relatively dilute but dispersed feed. However, the particles in this mixture lacked a lubricant and the collected centrifuge cake was dilatent upon classification and subsequent collection. Addition of conventional plasticers or lubricants such as a humectin, for example, in not preferred because these agents may tend to cause flocculation, ruining the dispersion of the particles in the slurry, or may segregate non-uniformly during the continuous classification process.

In accordance with this invention, it has been found that the introduction of an excess of a polymeric dispersant allows the particles to remain dispersed prior to classification, yet provides the needed lubrication to allow them to flow after classification. The polymeric dispersants useable is this invention can be virtually any commercially available one. Preferred dispersants include, but are not limited to: LD-45 (available from the National Starch Co., Bridgewater, N.J.) which is especially preferred with alumina powders classified in water, and Darvan C and Darvan 821A (both available from R. T. Vanderbilt Co., Norfolk, Conn.).

The amount of dispersant added will vary with the type of dispersant and powder. It should be enough to impart plasticity to the classified cake, but not be so much as to interfere with flow or dispersion characteristics of the slurry as it is classified.

The above invention may be better understood with reference to the following examples, which are not intended to limit the scope of this invention.

EXAMPLE 1

A two stage classifying system was first primed with one residence volume of water. $Al_2O_3$ (60 weight percent) A-16 Superground from Aluminum Company of America, Pittsburgh, Pa., was mixed with water (39.25 weight percent) and the dispersant, a polymeric polyelectrolyte sold under the brand name Narlex LD-45 (0.75 weight percent suspension basis). This mixture was milled, filtered, then pumped into the classifier feed tank. The feed suspension was then pumped at 0.85 kg/min into the first stage classifier, operating at 1268 rpm which resulted in the removal of the particles larger than 0.8 micrometers from the feed stream. The particles were collected in a bowl.

Suspension containing particles smaller than 0.8 micrometers was pumped at 0.760 kg/min into the second stage classifier operating at 1942 rpm. Here a separation of particles of 0.5–0.8 micrometers with a specific surface area of $9.6 \text{ m}^2/\text{g} \pm 0.5 \text{ m}^2/\text{g}$, calculated for over 150 production runs was achieved.

In all these narrow sized classified cakes, the powder formed a dilatent sediment which was very difficult to remove from the centrifuge bowl. A hammer and chisel proved most effective for powder removal after drying the cake and bowl together at 200° C. for 30 minutes.

EXAMPLE 2

A stock suspension of the following materials was made and milled for 24 hours on a roller mill:
  4.0 Kg A16 SG alumina (Aluminum Co. of America, Pittsburgh, Pa.)
  3.6 Kg deionized water
  50 g LD-45

A feed suspension was made, starting with 1.0 Kg of the stock suspension and diluted with 2.2 Kg of distilled water and 800 g LD-45 solution. The feed suspension was milled for 30 minutes, filtered, and pumped into a classifier feed tank similar to that described in the above-referenced patent U.S. Pat. No. 4,781,671, and processed as shown in FIG. 1.

The feed was pumped at 0.3 Kg/minute into a first classifier operating at 3120 rpm. The fines overflow from the first classifier was pumped at 0.17 Kg/min into a second classifier operating at 4000 rpm. Fines overflowing this classifier were discarded.

Adding the additional dispersant causes an increase in solution viscosity from 1.1 to 2.4 cP, measured at 100 sec$^{-1}$.

Equation 1 below predicts the particle size cut in second bowl:

$$v = h/t = \frac{Kr^2 g(\rho_p - \rho_m)}{\zeta}.$$

where v=a particle's settling velocity, h=the distance through which the particle settles, t=the time required for the particle to settle through distance h, r=the particle radius, g=acceleration due to gravity, $\rho_p$=particle density, $\rho_m$=density of the medium, $\zeta$=liquid viscosity, and K=the particle-shape factor (2/9 for a sphere), which takes into account both a particle's volume and its cross-sectional area. This equation predicts an average equivalent spherical diameter particle size fraction of from about 0.4 to 0.8 micrometers, which was verified by scanning electron microscopy.

The narrow size range powder collected in the bowls was not dilatent. Rather, it was plastic and could easily be scooped out of the bowl. These results verify optimal particle dispersion while creating a centrifuge cake that plastically deforms. The cake had a viscosity of 670 cP at 100 sec$^{-1}$.

What is claimed is:

1. A process for classifying colloidal material comprising:
   (a) preparing a slurry comprising particles selected from the group consisting of metallic particles and ceramic particles and a polymeric dispersant employing a quantity of dispersant in substantial excess of that amount necessary for dispersion of the particles;
   (b) introducing the slurry into a centrifuge means for classifying the particles, the centrifuge means including a bowl means for receiving classified particles; and
   (c) removing the classified particles from the bowl means.

2. A process according to claim 1 wherein step (a) includes preparing a slurry from ceramic particles selected from the group consisting of: alumina, yttria, silicon nitride and its alloys, forsterite, mullite, cordierite and mixtures thereof.

3. A process according to claim 2 wherein step (a) includes preparing a slurry from alumina particles.

4. A process according to claim 1 wherein step (a) includes using polymeric dispersants selected from the group consisting of LD-45, Darvan C, and Darvan 821A.

5. A process according to claim 6 wherein step (a) includes using LD-45 as the polymeric dispersant.

6. A process according to claim 5 wherein step (a) includes introducing LD-45 in an amount ranging from approximately 20–30 weight percent.

* * * * *